United States Patent [19]
Brown

[11] 3,772,110

[45] Nov. 13, 1973

[54] METHOD FOR CONSTRUCTION OF PLASTIC ENCLOSURE

[75] Inventor: Leslie C. Brown, Decatur, Ill.

[73] Assignee: General Electric Company, Syracuse, N.Y.

[22] Filed: Jan. 16, 1970

[21] Appl. No.: 3,454

[52] U.S. Cl..................... 156/73, 156/380, 264/45, 312/9
[51] Int. Cl.. B32b 31/20, A47b 81/06, B29d 31/00
[58] Field of Search..................... 156/73, 254, 380; 264/45; 18/45; 312/9, 45

[56] References Cited
UNITED STATES PATENTS

| | | | |
|---|---|---|---|
| 3,390,214 | 7/1968 | Woods | 264/45 |
| 2,929,105 | 3/1960 | Starck et al. | 18/42 |
| 3,501,214 | 3/1970 | Wiandt | 312/8 |

OTHER PUBLICATIONS

Butzko, R. L., Plastic Sheet Forming, Reinhold Publishing, N.Y. 1958.

Duffin, D. J., Laminated Plastics, Reinhold Publishing, N.Y. 1966.

Kolb, D. J., "Designing Parts For Ultrasonic Assembly," Machine Design, March 16, 1967.

Gower, C. H., Plastic Paint, Spon Ltd., London, 1962.

Silicone Rubber Handbook, "Fabricating," General Electric, Waterford, N.Y. 1970.

Jarvis, W. D., Painting and Decorating Encyclopedia, Chicago, Goodhear-Willcox Co., 1965.

*Primary Examiner*—Benjamin A. Borchelt
*Assistant Examiner*—J. V. Doramus
*Attorney*—Marvin A. Goldenberg, W. J. Shanley Jr., Frank L. Neuhauser, Oscar B. Waddell and Joseph B. Forman

[57] ABSTRACT

Phonograph consoles are constructed from a series of all plastic panels which have been injection molded to very closely resemble the surfaces of master wooden panels. The plastic panels have a pressure-formed polyurethane foamed into their backs, and they are sonic welded together to form the console cabinet. The outer panel surfaces of the cabinet are sprayed with a glaze, after which a finishing coat is applied. The resultant phonograph console has a cabinet which not only has a wood grained finish, but also has excellent acoustical characteristics.

10 Claims, 10 Drawing Figures

Patented Nov. 13, 1973

INVENTORS.
LESLIE C. BROWN.

BY
Thomas A. Brody
ATTORNEY.

METHOD FOR CONSTRUCTION OF PLASTIC ENCLOSURE

BACKGROUND OF THE INVENTION

This invention relates to enclosures constructed from plastic panels, and a method for constructing such plastic panels and enclosures. More particularly, the invention concerns itself with plastic phonograph cabinets and a process for manufacturing these cabinets.

Most prior art phonograph consoles have utilized relatively expensive and bulky cabinets constructed of a plurality of wood panels secured together to provide a housing for a record changer, an amplifier, one or more speakers, and an optional radio frequency tuner. In view of the bulkiness of the phonograph console cabinet, it has usually been manufactured in a separate and distinct manufacturing facility from the location wherein the other phonograph components are manufactured or sub-assembled. Often, this has involved the undesirable expense of transportation costs for shipment of the phonograph console cabinets to the location of final assembly for manufacturing the phonograph console.

It is known that some molded plastic panels have been manufactured with a wood grained type of finish, and then used as part of the overall phonograph console cabinet, in order to achieve particular decorative designs (e.g. at the front of the phonograph console cabinet). However, it has been found that these prior art plastic panels have fallen considerably short of achieving authentic simulation of a wood grained finish, for example, by over-emphasizing the grain, and thus creating an artificial looking deepened wood grain appearance.

An important object of the present invention is to provide an improved phonograph console which is constructed so that it may be finally assembled in one general manufacturing location, in the vicinity of where its cabinet has been assembled.

Another object of this invention is to provide an improved phonograph console which is relatively inexpensive and includes a housing constructed substantially of plastic panels having a wood grained finish.

An additional object of this invention is to provide an improved plastic phonograph cabinet for a phonograph console, which may have a variable density, is inexpensive to fabricate, and is characterized by excellent acoustical properties.

A further object of this invention is to provide a substantially plastic acoustical enclosure which readily lends itself to improved efficiency in controlling the cost of the enclosure.

A still further object of the present invention is to provide a console cabinet which effectively eliminates warping, splitting, and the undesirable effects of poor surface sanding.

Yet another object of the present invention is to provide an improved process for manufacturing phonograph console cabinets having a wood grained finish on the exterior thereof, which has enhanced durability.

Still another object of my invention is to provide an improved method of manufacturing plastic panels having a wood grained finish.

SUMMARY OF THE INVENTION

In accordance with one aspect of the present invention, there is provided a phonograph console that includes an all plastic cabinet fabricated from a plurality of discrete plastic panels each of which is injection molded. Each of the panels is constructed of injection-molded polystyrene, and has pressure-formed polyurethane foamed into its back side. The panels are sonically welded together to form a console cabinet. After attachment of the panels together, the cabinet is finished with a wood grained appearance. In this cabinet there is positioned a record changer and a tuner-amplifier, together with two separate speaker enclosures. In each speaker enclosure, there is physically supported one or more speakers. The speakers are connected to the tuner-amplifier in such a manner as to provide an FM stereo effect. The cabinet of this phonograph has the attractive overall appearance of a wood grained finish, is of consistent construction, and is very rigid and durable. The acoustical properties of the phonograph console are effectively controlled by regulating the thickness and characteristics of the foam backing on the panels.

For manufacturing the phonograph console set forth above, there is provided a process for making plastic panels that closely resemble wood panels. This process comprises the steps of 1.) treating the surface of a desired master wooden panel with a solvent to remove wood resins from the open grain areas of the surface, 2.) forming a silicon rubber casting of the surface, 3.) forming a ceramic replica of the master wood panel from the silicon rubber casting, 4.) forming a metallic casting of the ceramic replica, 5.) injection molding a plastic panel from the metallic casting so that the plastic panel has an outer surface generally resembling the contours of the surface of the wooden panel, 6.) filling the back surface of the plastic panel with a foamed plastic material, 7.) spraying the outer surface of the panel with a glaze, 8.) wiping excess glaze off of the panel, and 9.) covering the glazed surface with a top coat to provide a finished surface of the panel that closely resembles the finished surface of actual wood.

By further aspects of the present invention, additional desirable features may be included in the phonograph console device and processes embodying our invention. The specification concludes with claims particularly pointing out and distinctly claiming the subject matter which we regard as our invention. The invention, however, as to organization and method of operation, together with further objects and advantages thereof, may best be understood by reference to the following description, when taken in conjunction with the accompanying drawings in which:

DESCRIPTION OF PREFERRED EMBODIMENTS

Figure 1:
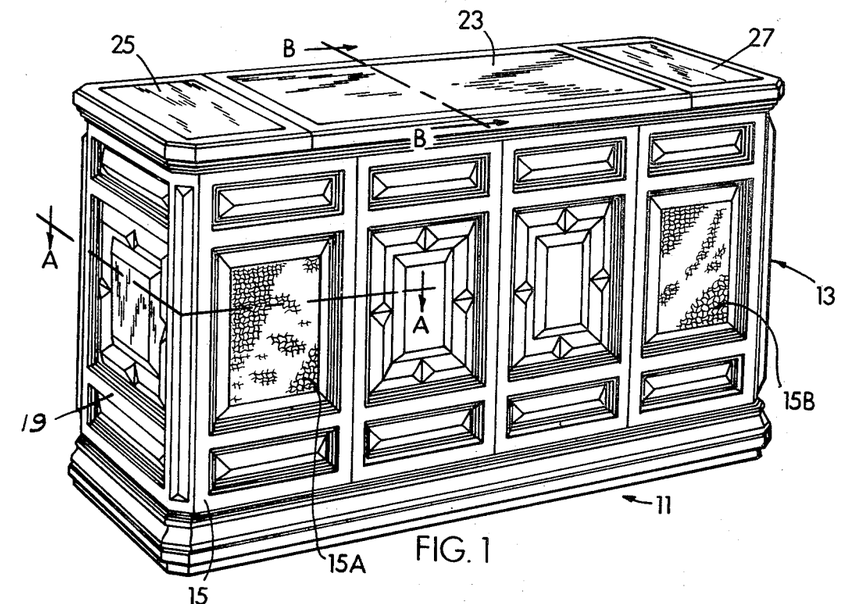
FIG. 1 is a frontal perspective view of a phonograph console embodying one form of the present invention.
Figure 2:
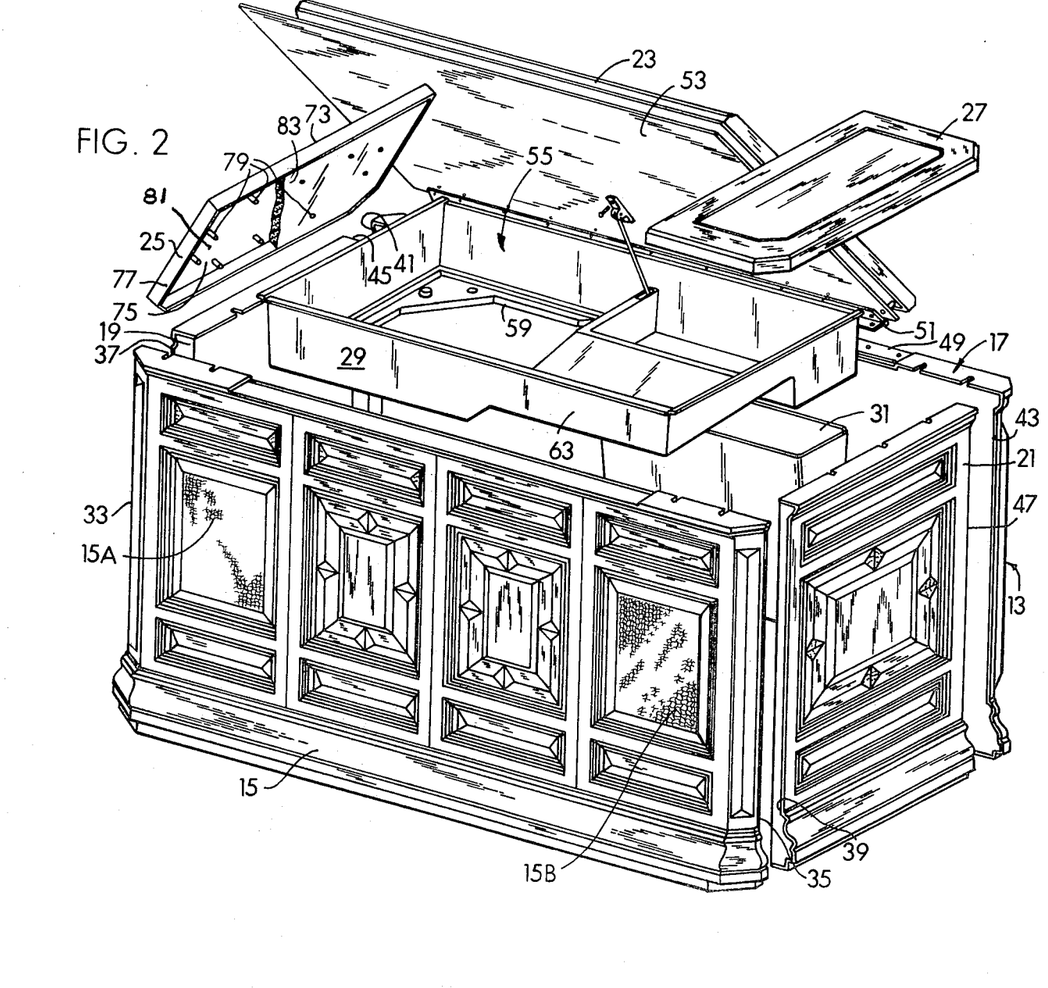
FIG. 2 is an exploded perspective view of the cabinet of the phonograph console shown in FIG. 1, the record changer and amplifier having been removed to show more clearly the cabinet structure.

Referring first to FIGS. 1 and 2, there is shown a phonograph console 11 having a cabinet 13 which comprises vertical sides 15, 17, 19, and 21, a pivotally supported lid 23, top portions 25 and 27 which are arranged on each side of the lid, a plastic supporting tray 29, and a record storage bucket 31.

Vertical side 15 of the cabinet represents the front wall thereof, and it has its opposite ends 33 and 35 connected respectively to the front vertical edges 37 and 39 of end 19 and end 21, which effectively form the sides of the cabinet structure. Vertical wall 17 of the cabinet represents the back thereof, and its end edges 41 and 43 are connected respectively to the rear vertical edges 45 and 47 of ends 19 and 21.

The top portions 25 and 27 are connected to the top edges of the vertical panels near each end thereof, as shown in FIG. 1, and the lid 23 is pivotally secured to a horizontal upper surface 49 of wall 17, by means of an elongated hinge 51. To provide an attractive appearance for the lid 23, it includes a liner 53, which is secured to the recessed inner side of the lid 23, as will be set forth in detail hereinafter.

Figure 3:
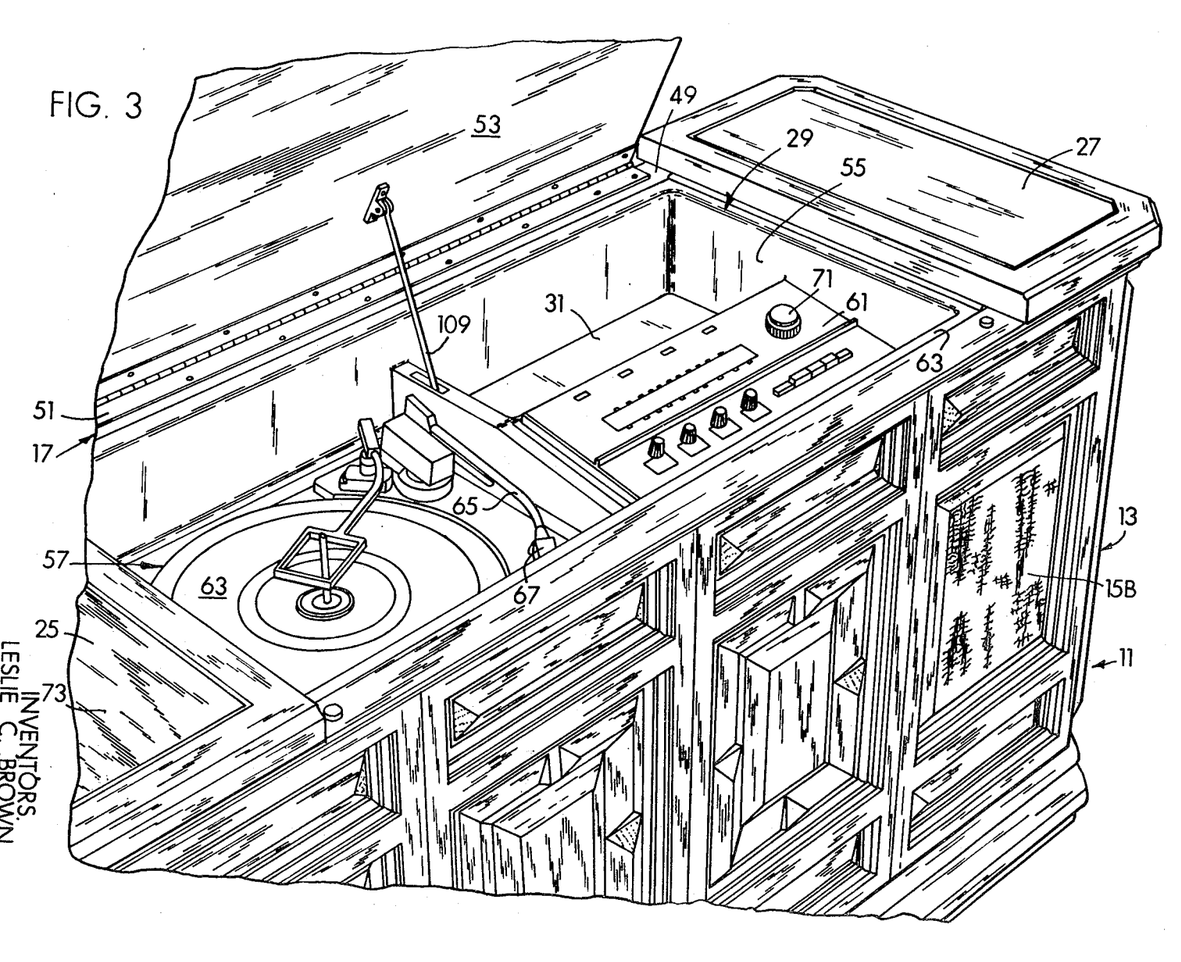
FIG. 3 is a fragmentary and an enlarged perspective view, showing the record changer and amplifier ensconced in their supporting recess within the plastic console cabinet.

As best shown in FIG. 3, the supporting tray 29 is secured to the upper edges of the vertical panels of the cabinet, between the top portions 25 and 27, and it provides a well 55 within which there is located a record changer 57, that fits into and depends from slot 59 (FIG. 2) and a tuner and amplifier unit 61 which fits into the right side of the well 55 near front wall 63. The record storage bucket 31 extends downwardly from the rear of the supporting tray or bucket 29 and is secured to the tray to provide a place for storing records.

As shown in FIG. 3, the record changer 57 includes a turntable 63 which has a tone arm 65 and a cartridge 67. The tuner and amplifier 61 incorporates a series of knobs 69 for controlling "on," "off," "volume," "treble," and "bass" response of the phonograph and tuner. A frequency selection knob 71 is also provided for the tuner - amplifier unit 61.

To effectively provide an all-plastic cabinet 13 for the phonograph console 11, which has the aesthetic appeal of an authentic wood grained finish, the front, back, and end panels 15, 17, 19, 21 respectively, are specially constructed from an injection molded polystyrene plastic which has a polyurethane foam filling on its back side. These panels 15, 17, 19, and 21 are sonically welded together to form the four vertical sides of the cabinet. Turning now to a more detailed explanation of the construction of the plastic panels utilized in the cabinet (e.g. panels 15, 17, 19, 21, 23, 25, and 27) attention is directed to FIGS. 2 and 7. As shown therein, the top panel 25 of the cabinet 13, is injection molded from polystyrene having a thickness of approximately one-eighth of an inch. More particularly, top panel 25 includes an outer horizontal surface 73, an inner horizontal surface 75, a vertical flange 77 which is disposed perpendicularly from the horizontal surfaces 73 and 75, and a plurality of projecting studs 79. The vertical flange 77 extends perpendicularly from the perimeter of well 81, within which there is formed a polyurethane foam 83. The well 81 on the back side of the panel 25, for the illustrative embodiment, is filled full with polyurethane foam to an approximate depth of three-eighths inch. The application of foam to a reservoir on the reverse side of each of the thin plastic panels, represents an important aspect of the present invention, since the thickness and/or density of the plastic material applied may be varied to control the acoustical properties of the console cabinet 13. In addition, the quantity and density of the foam 83, may be effectively varied to control the ruggedness, strength, and total weight of the cabinet 13, thereby enabling the manufacturer to provide a totally plastic cabinet which not only simulates a wood grained appearance at its exterior, but also feels like wood.

For constructing the various plastic panels, an advantageous manufacturing process has been achieved which is so effective in achieving a wood grained external appearnace that it is extremely difficult for one skilled in the art to discriminate between the appearance of a panel constructed in accordance with this invention and one actually made from finished wood.

Figure 7:
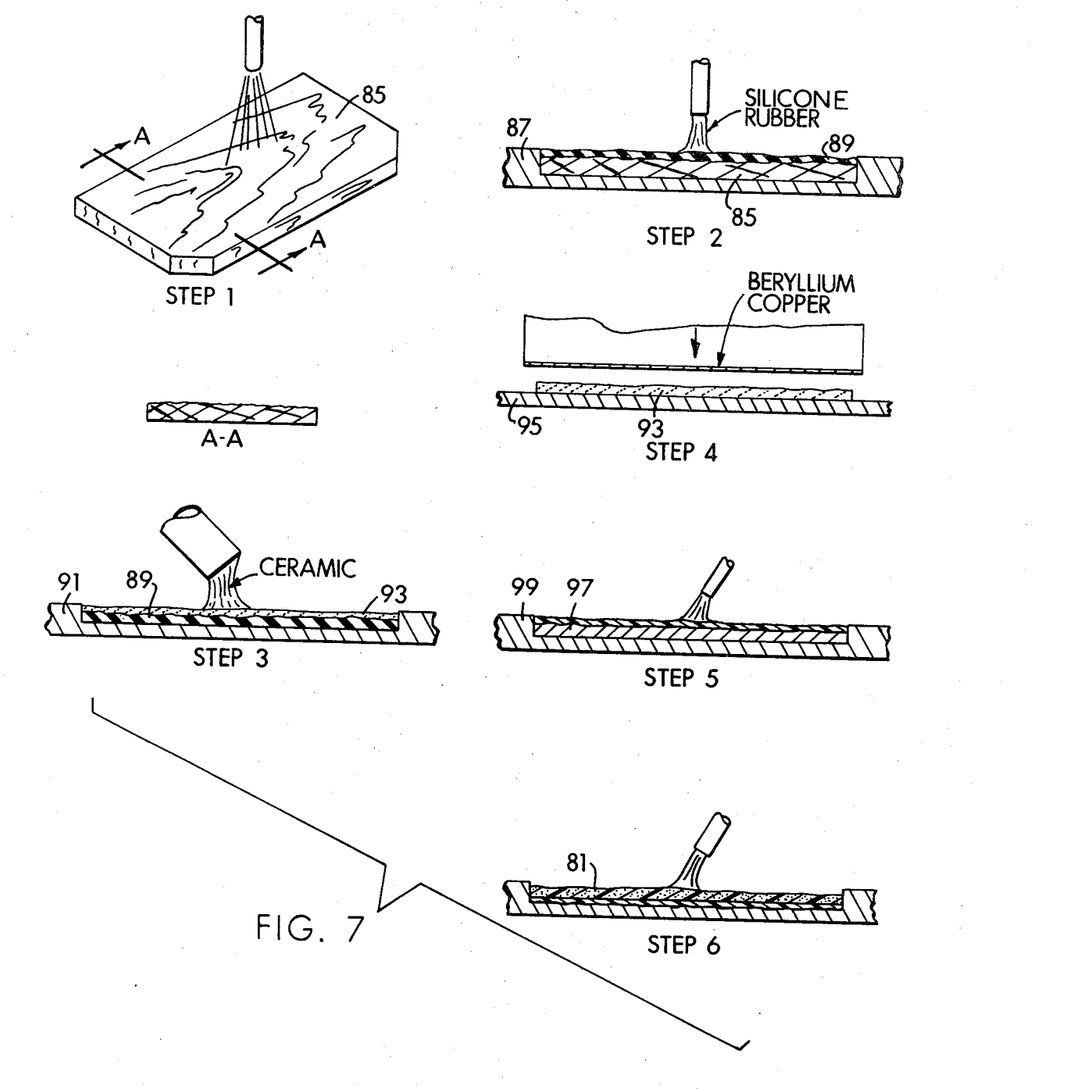
FIG. 7 shows the sequence of steps which in accordance with the present invention may be effectively utilized for manufacturing plastic panels incorporated in a phonograph console.
Figure 8:
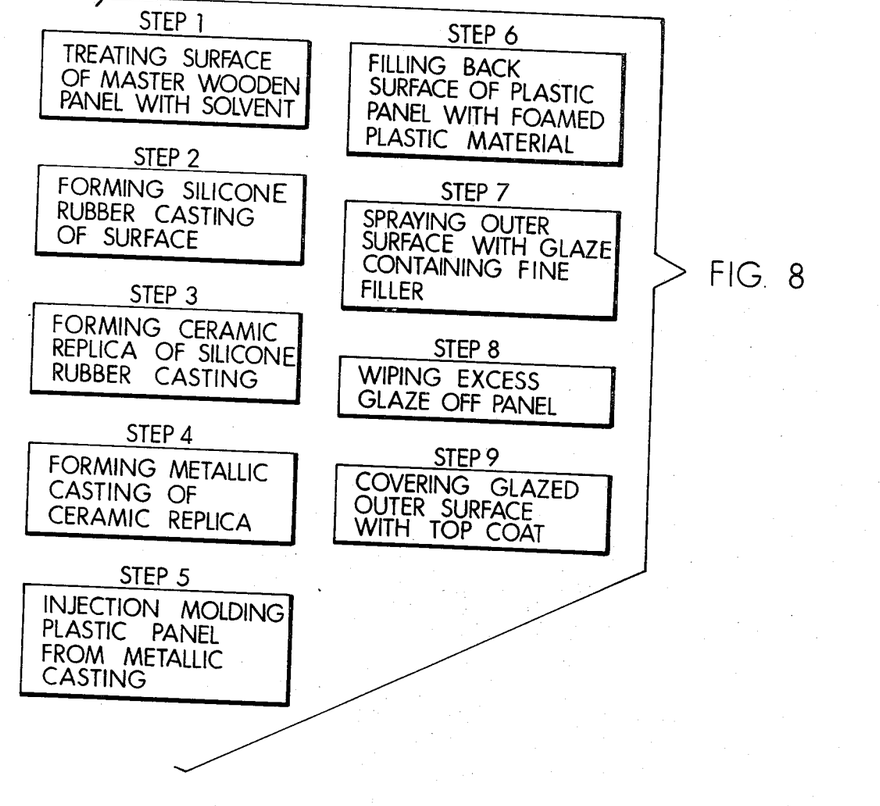
FIG. 8 shows a series of nine steps which are followed in accordance with the present invention to make plastic panels that closely resemble wood panels.

For an explanation of the method used to manufacture plastic panels in accordance with the present invention, attention is directed to FIGS. 7 and 8. FIG. 7 illustrates the first 6 steps which have been effectively utilized for forming plastic panels in accordance with the present invention. FIG. 8 shows schematically a more complete listing of the steps required to make a panel in accordance with the invention.

To begin with, it is important as the initial step required for manufacturing plastic panels, to obtain a wooden panel that may serve as a master. Such a panel is shown as panel 85 in FIG. 7, and it has a wood grain which is aesthetically attractive and which the manufacturer desires to reproduce in appearance on a plastic cabinet. The external surface of the master panel 85 from which the wood grain reproduction is desired, is first treated (e.g. by scrubbing) with a solvent, such as for example alcohol or a mild acid, to remove wood resins from the open grain areas of the wooden surface. This is an important step in manufacturing a plastic panel that has the authentic appearance of wood, since it helps to provide fidelity of grain detail in the various castings utilized to achieve a finished plastic panel. Heretofore, wood grains have been reproduced in castings by first scrubbing the grain of the master wooden piece with a steel brush to clean and deepen the grain. However, this has resulted in an artificial looking deepened grain. By washing the resins out of the wooden pattern, the casting tools made from the master wood panel, produce plastic parts with a sharp, fine surface, into which a final glaze readily clings during the subsequent wiping process.

After completion of the first step (viewing FIGS. 7 and 8), the desired wood panel pattern (not shown) is placed in a mold 87 and silicone rubber is poured into the mold, as shown for Step 2 in FIG. 7, to form a silicone rubber casting 89. This constitutes Step 2 of the process set forth in FIG. 8.

After forming a silicone rubber casting from the wooden pattern, as illustrated in FIG. 7, the silicone rubber casting 89 is inserted in a mold 91, and ceramic material is poured into the mold to form a ceramic replica 93 of the wood master from the silicone rubber casting. This is shown as Step 3 in FIGS. 7 and 8. After the completion of Step 3 by the formation of the ceramic replica of the wooden master panel 85, the ceramic replica 93 is placed in a suitable mold 95, and a beryllium copper mold 97 is cast therefrom. This constitutes Step 4 as shown in FIGS. 7 and 8. The next step in the process of manufacturing plastic panels is to place the beryllium copper mold 97 into an injection molding apparatus 99, as shown in Step 5 of FIG. 7.

It is important to note that the plastic panel formed in the injection molding apparatus 99 has a very thin construction and includes the already mentioned well or reservoir 81 on its back side. This is not shown in FIG. 7, for purpose of drawing simplification.

For Step 6, after the panel has already been injection molded, it is filled with two liquid agents that combine to form a foamed polyurethane. Preferably a temporary plate (not shown) is put on the top of the foaming solution to captivate it during the foaming action.

If the plastic panel is desired for immediate use as part of an already finished cabinet or other similar device, after the completion of Step 6 (as shown in FIGS. 7 and 8) the outer surface 73 of the plastic panel is sprayed with a glaze containing a fine filler. This constitutes Step 7.

Upon completion of Step 7, the glazed outer surface of the panel is wiped to remove excess glaze therefrom. The glaze is wiped off the panels in such a manner as to leave light and dark streaked areas which simulate highlighting of actual wood and also to leave dark grain areas where the glaze has clung in the tiny grain-like crevices.

After the completion of Step 8 involving the wiping of excess glaze off of the panel, Step 9 is then initiated. This involves covering the glaze of the plastic panel with a clear finish coat.

Figure 9:
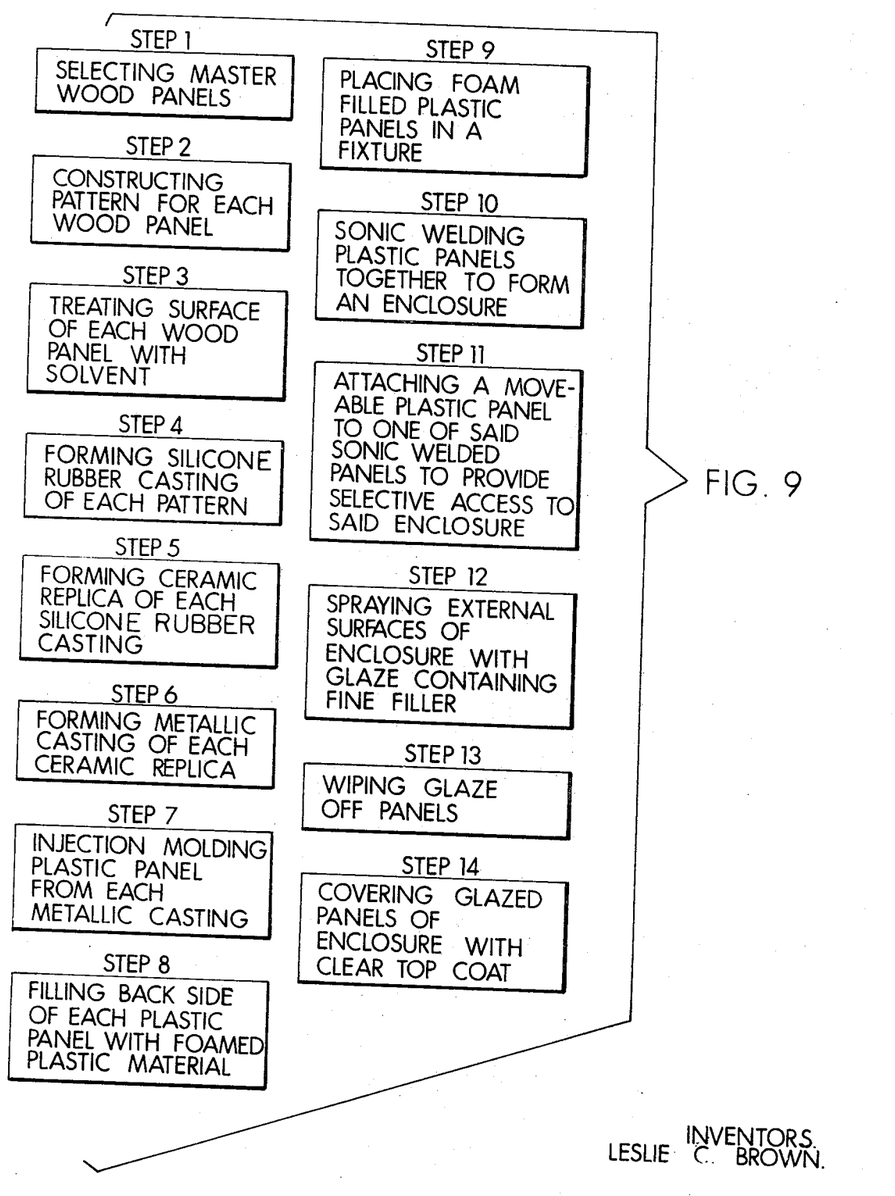
FIG. 9 shows a series of fourteen steps which may be followed in accordance with the present invention to efficiently construct a phonograph console cabinet which is made entirely of plastic.

For constructing an all-plastic phonograph console cabinet 13 in accordance with the present invention, the process set forth in FIG. 9 has been found to be particularly desirable. The first step involved in this process is to select a group of master wooden panels which will provide an aesthetically appealing over-all design for a finished cabinet. By way of example, a master wood panel is selected as a front, back, and end panels and a master wooden panel is also selected for the lid and liner, correlative to the plastic panels of the console cabinet 13 shown in FIG. 2. It should be noted that the wood panels correlative to end panel 19 and end panel 21 of the console 11 shown in FIG. 2, are identical in external and internal configuration. In view of this, the master wood panel for each of these plastic panels can be the same. In addition, the master wooden panels for top portions 25 and 27 are the same. Lastly, the vertical front panel 15 and vertical rear panel 17 may be similarly constructed. One of the advantages residual in providing an all plastic console cabinet 13 in accordance with the present invention, is that the structure readily lends itself to having a finished front and back section for the console cabinet.

A pattern is thereupon constructed for one or more of the wood panels, i.e., each panel has a design carved therein if desired. This constitutes Step 2 of the procedure set forth in FIG. 9.

After a pattern has been constructed for one or more wood panels of the console cabinet, the external surface of each wood panel is thereupon treated with a solvent, in the same manner as previously set forth for forming a plastic panel per se. It will be understood by those skilled in the art that the external surface of the master wood panel might also have been treated with a solvent before constructing the pattern for the wood panel. However, for purposes of the illustrative process set forth in FIG. 9, the pattern is constructed before the solvent application.

Step 4 involves the formation of a silicone rubber casting for each pattern. This is followed by the formation of a ceramic replica of the wood master from each silicone rubber casting (Step 5). A beryllium copper casting is then manufactured from each ceramic replica. This is Step 6.

Step 7 is the making of a suitable mold incorporating each beryllium copper casting to mold the plastic panels by injection molding.

Each of the injection molded plastic panels then has its back side filled with a foamed plastic material such as polyurethane, in the manner previously set forth in FIG. 7. This is Step 8 of FIG. 9.

The plastic correlative has now been formed for each of the master wooden panels of the console cabinet. At this point, which involves Step 9, each of the foam filled vertical plastic panels, such as front and rear panels 15 and 17 and end panels 19 and 21, are secured together such as by means of screws or preferably by a fusing process such as sonic welding. To secure the panels by sonic welding, they are placed in a fixture (not shown) and welded together to form the framework of a cabinet enclosure. This constitutes Step 10, of the process sequence set forth in FIG. 9. The foam filled vertical panels are thus put in a fixture to form a box and sonically welded together. Branson type of sonic welding equipment may be effectively used for this operation (Branson Sonic Power Company, Danbury, Conneticut). After the securement of the vertical panels by welding, step 11 may involve the attachment of hinge 51 to the rear panel 17, as well as to the lid of the cabinet. This provides a pivoted door which achieves selective access to the phonograph components within the cabinet enclosure. It should be noted that cabinet lid 23 has a flat plastic liner 53 secured to its inner surface. The liner 53 is formed by the process set forth in FIG. 8, so that its outer surface has the appearance of a wooden panel. Between liner 53 and lid 23 there is a polyurethane filling.

After the completion of Step 11 (FIG. 9), the external surfaces of the cabinet 13 (including liner 53) are all sprayed with a glaze containing a fine filler material.

Upon the completion of Step 12 which involves the application of a glaze to the external surfaces of the plastic cabinet, each of the panels is then wiped off in such a manner as to leave light and dark streaked areas which simulate high-lighting of wood and also to leave dark grain areas where the glaze has hung in the tiny grain crevices. This constitutes Step 13. The final step in manufacturing the console cabinet is the application of a clear top coat to cover the glaze on all the external surfaces of the cabinet. This constitutes Step 14.

Figure 5:
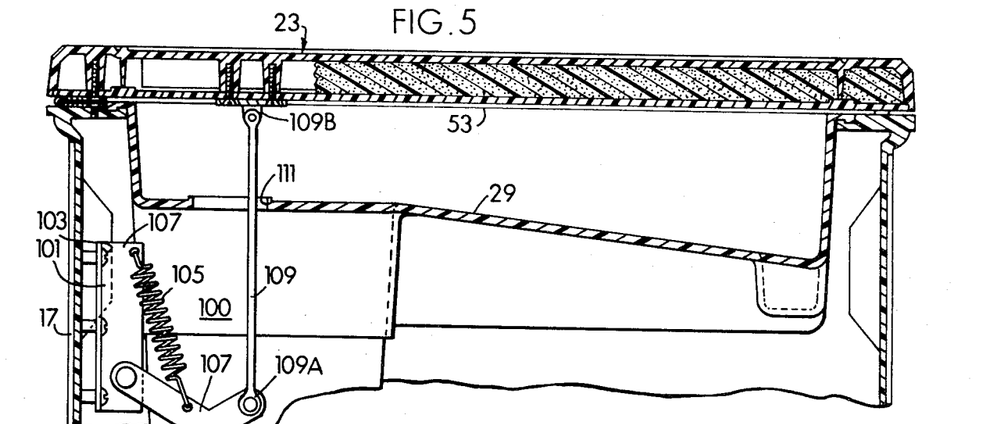
FIG. 5 is a fragmentary sectional view of the upper portion of the console cabinet, taken generally along the lines B—B of FIG. 1.
Figure 6:
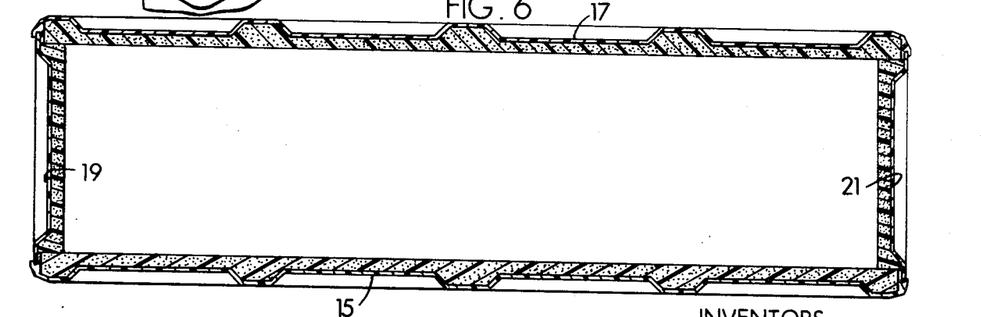
FIG. 6 is a horizontal sectional view of the phonograph cabinet.

It should be understood by those skilled in the art that for many phonograph console cabinet designs, it would not be necessary to include a top portion 25 and a top portion 27 on either side of the well 55 in which the record changer and tuner controls are located. For this reason, the list of process steps set forth FIG. 9 for manufacturing a phonograph console cabinet, does not include the attachment of top panels to the sonically welded vertical panels. However, for the illustrative embodiment shown in FIGS. 1, 2 and 3, the top panels 25 and 27 are sonically welded to the top of the vertical panels (viewing FIG. 2) after the securement of supporting tray or bucket 29 to upper edges of the vertical panels, by sonic welding. Further, with respect to the illustrative cabinet 13, before sonic welding the bucket 29 to the vertical panels, a counterbalancing mechanism 100 is assembled to the cabinet, shown in FIG. 5. For this a bracket 101 is secured to the inner surface of the rear panel 17 by means of screws 103. A tension spring 105 is connected between a flange 107, or bracket 101 and a pivoted element 107. The pivoted element 107 is loosely linked via a rod 109 to the inner surface of the lid 23 of the cabinet. More particularly, the rod 109 has its bottom end 109A, connected to the pivoted link 107. The other end of the rod extends through a slot 111 formed in the bucket 29. The upper end 109B of the rod is connected in swivel fashion to a bracket formed on the inner liner 53 of the lid 23. In view of the passage of the rod 109 of the counterbalancing mechanism through slot 111 of the bucket or supporting tray 29, it has been found expedient to attach the counterbalancing mechanism to the plastic cabinet prior to the insertion and attachment of bucket 29. However the free end 109B of the rod 109 might preferably not be attached to the lid 23 of the cabinet until after the securement of the bucket 29 to the vertical walls of the cabinet.

After the complete assembly of the cabinet 13, including its finishing, which then resembles in striking fashion the outer appearance of wood paneling, record changer 57 is thereupon dropped into the bucket 29 so that it fits into slot 59. The changer 57 is secured to the bucket by suitable screws. In similar fashion, the tuner and amplifier unit 61 is located in an appropriate slot of the bucket and secured thereto.

Figure 4:
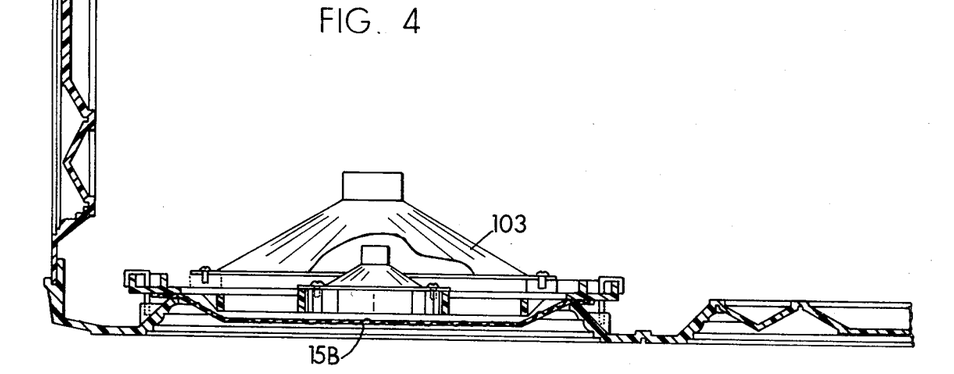
FIG. 4 is a fragmentary sectional view of the phonograph console of FIG. 1 taken along the lines A—A.

In the course of the final assembly of the phonograph console 11, one or more speakers such as the speaker 103 shown in FIG. 4 is secured behind a front panel portion, such as 15A of FIG. 2. In like fashion, another speaker such as the speaker 103 may be secured behind the panel portion 15B of FIG. 2. The panel portions 15A and 15B are preferably covered by grill cloth to provide the appropriate appearance and acoustical effect. It will be understood by those skilled in the art that the location of speakers in the front panel portions 15A and 15B, coupled with a stereo amplifier unit 61, might expeditiously provide the reproduction of stereo sound from the phonograph console 11.

Figure 10:
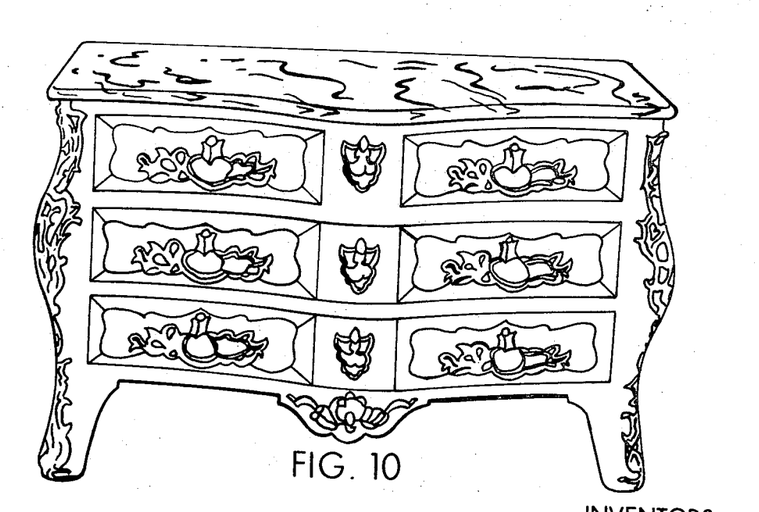
FIG. 10 shows an alternative embodiment of an all plastic phonograph console, the cabinet of which involves the general structure known as a "Bombe Commode."

In view of the fact that the cabinet 13 embodying this invention is manufactured by injection molding and sonic welding techniques, almost any enclosure configuration may be reproduced for a phonograph console cabinet. In addition, furniture having a round drum-like appearance such as drum tables, round or octagonal commodes, lamp bases, etc. can be economically reproduced and utilized as a phonograph console cabinet or the like. As further examples, elliptical, conical, horn shapes and other various configurations of acoustical enclosures are easy to produce. One specific example of an all plastic cabinet design which may be manufactured in accordance with this invention, is shown in FIG. 10. It will be noted that the vertical walls of the cabinet in FIG. 10 have curved or undulated portions. Such shapes as this are easy to manufacture in accordance with the present invention.

It has been stated that the foamed polyurethane is added to the polystyrene panel to provide strength or rigidity as well as to control the acoustical characteristics of the plastic enclosure. It will be recognized that this feature of strength or rigidity, i.e., structural integrity, can be provided by many other materials such as a tar-based substance, which like the foamed plastic can be applied in its liquid state, or wood panels cut to fit into the well on the back side of the polystyrene panel.

It will now therefore be seen that the new phonograph console heretofore described is simplified in structure, efficient in operation, readily manufacturable and low in cost. It will be recognized that the process of this invention readily lends itself to the reproduction of other surfaced panels such as slate or brick as well as wood. It is also apparent that the plastic panel reproductions can be assembled to form any enclosure by the techniques described for the fabrication of phonograph cabinets. Thus while the preferred embodiments of the invention have been described, the scope of the invention is intended to be limited only by the appended claims and not by the details of the foregoing description.

What is claimed and desired to be secured by Letters Patent of the United States is:

1. A method of making a plastic enclosure comprising:
   a. selecting a plurality of master panels desired for reproduction in plastic to form the walls of said enclosure,
   b. treating the surface of each master panel with a solvent to cleanse the grain areas thereof,
   c. forming a plurality of castings each of which corresponds to one of said master panels for reproducing the surface contours thereof,
   d. molding a plastic panel from each casting,
   e. adding a material to the back side of each plastic panel to provide structural rigidity therefor,
   f. securing mating edges of said plastic panels together to form said enclosure,
   g. directly coating the exposed surfaces of said enclosure with a galze containing a filler,
   h. wiping excess glaze off of the plastic panels in a manner to reproduce the color and appearance of the surfaces of the related master panels, and
   i. coating the glazed surface of said enclosure to provide a finished appearance substantially the same as that of a finished enclosure made from said master panels.

2. The method recited in claim 1 wherein the securing of said plastic panels is achieved by fusing said mating edges together.

3. The method recited in claim 2 wherein the fusing of the mating edges of said plastic panels is achieved by sonic welding.

4. The method recited in claim 1 wherein said plastic enclosure is better adapted to contain apparatus for the reproduction of sound by adding said material to a thickness and density to have the plastic panels approximate the physical characteristics of said master panels and to obtain the desired acoustical characteristics for said enclosure.

5. The method recited in claim 4 wherein the molding of each plastic panel is by injection molding and the adding of said material is by filling said back surface with a foamed plastic.

6. The method of claim 5 in which polystyrene is used as the plastic material for the injection molding step.

7. The method of claim 6 in which the back side of each panel is filled with two or more liquid agents to form a foamed polyuretane.

8. The method recited in claim 1 wherein one of said plastic panels is releasably secured to provide an access door for said enclosure.

9. The method recited in claim 1 wherein said master panels are wood and the excess glaze is wiped off the plastic panels to leave light and dark streaked areas to simulate the highlighting of wood.

10. The method recited in claim 9 wherein an ornate pattern is constructed in the surface of one or more master panels prior to the step of treating with a solvent.

* * * * *